United States Patent [19]

Crookston

[11] Patent Number: 4,804,578
[45] Date of Patent: Feb. 14, 1989

[54] INSULATED ROOF BOARD

[75] Inventor: Anthony J. Crookston, Akron, Ohio

[73] Assignee: Old Reliable Wholesale, Inc., Barberton, Ohio

[21] Appl. No.: 224,732

[22] Filed: Jul. 27, 1988

[51] Int. Cl.⁴ .......................... B32B 3/26; B32B 5/16
[52] U.S. Cl. ............... 428/304.4; 428/313.3; 428/313.5; 428/316.6
[58] Field of Search .................. 428/304, 313.3, 313.5, 428/314.4, 314.8, 316.6, 318.4

[56] References Cited

U.S. PATENT DOCUMENTS

| | | | |
|---|---|---|---|
| 3,135,069 | 6/1964 | Schuller et al. | 52/516 |
| 3,598,688 | 8/1971 | Bellamy | 428/67 |
| 3,619,961 | 3/1970 | Sterrett et al. | 52/302 |
| 3,653,170 | 4/1972 | Sheckler | 52/375 |
| 3,763,605 | 10/1973 | Freeman | 52/58 |
| 3,763,614 | 10/1973 | Hyde et al. | 428/314.4 |
| 4,021,981 | 5/1977 | Van Wagoner | 52/309.13 |
| 4,189,886 | 2/1980 | Frohlich et al. | 52/302 |
| 4,250,136 | 2/1981 | Rex | 428/313.3 |
| 4,292,783 | 10/1981 | Mulvihill | 52/741 |
| 4,295,810 | 10/1981 | Dennert et al. | 425/110 |
| 4,559,263 | 12/1985 | Roodvoets | 428/314.4 |
| 4,587,164 | 5/1986 | Freeman | 428/314.4 |
| 4,651,494 | 3/1987 | Wagoner | 428/318.4 |

*Primary Examiner*—William J. Van Balen
*Attorney, Agent, or Firm*—Oldham and Oldham Co.

[57] ABSTRACT

Insulated roof board comprising a foamed plastic base layer, a coherent solid intermediate layer having void space therein to permit venting of water vapor, and a relatively hard, dense top layer. The intermediate layer is preferably foarmed by a plurality of shaped bodies, such as polystyrene beads, which are adhesively secured together.

14 Claims, 2 Drawing Sheets

INSULATED ROOF BOARD

TECHNICAL FIELD

This invention relates to roof structures and more particularly to a novel insulated roof board which provides good insulation, permits venting of water vapor, and is light in weight and yet strong.

BACKGROUND ART

Various roofing structures and systems are known. The object of most roofing systems is to provide insulation for the building which the roof covers, to keep the building dry, and yet to prevent water vapor from accumulating within the roofing system or structure. Accumulation of water vapor is damaging or destructive to the roofing system. Yet it is difficult to keep water out of the building and at the same time to prevent build-up of water vapor within the roofing structure. In addition, the roofing system must be strong enough to support any wind loads and snow loads to which it is subjected, to permit a person to walk on the roof, and (where desired) support an esthetically pleasing exterior member which constitutes the top layer of the roofing structure. Existing roofing systems achieve the aforesaid objects with varying degrees of success. In some cases there is a trade-off in which performance in one area is sacrificed in order to achieve top performance in another area. In particular, it is difficult to keep a building dry and at the same time to prevent the buildup of water vapor within the roofing structure. Various constructions have been proposed in order to achieve both objects.

U.S. Pat. No. 4,021,981 to Van Wagoner discloses a roofing system which comprises an insulation course and a protective layer, the former being placed atop a vapor impermeable membrane. The insulation course may be made of an expanded foam, e.g. polyurethane or polystyrene, glass beads, insulating concrete or bituminous blocks. The protective course is a fire-retardant material which is water but not vapor impermeable. Various materials are suggested, and a fiberglass reinforced surface bonding cement containing an acrylic polymer emulsion additive is disclosed is preferred.

U.S. Pat. No. 3,619,961 discloses, as a roof deck material, a foamed polystyrene board having channels therein to permit the escape of water vapor. Polystyrene board may be situated on a suitable base member such as concrete, and on top of this board may be placed an additional insulating layer, (e.g. light weight insulating concrete) and a water impermeable (e.g. bituminous coated roofing felt) top layer.

U.S. Pats. Nos. 3,135,069 to Schuller et al. and 4,189,886 to Frohlich et al. show other roofing structures with various layers through which air and water vapor may pass.

U.S. Pat. No. 3,598,688 to Bellamy shows a roofing construction which includes a waterproof layer and a wear resistant layer having vent openings therethrough at periodic intervals.

While various roofing constructions have been proposed, none has fully achieved the various desired characteristics of a roofing system, such as those noted above.

DISCLOSURE OF THE INVENTION

The present invention provides a novel insulated roof board which provides good insulation, is light in weight and yet strong and prevents the build-up of water vapor within the roofing structure.

The insulated roof board of this invention comprises a rigid, coherent insulating base layer, a coherent solid insulating intermediate layer having void space therein to permit venting of water vapor, and a relatively hard, dense top layer.

BRIEF DESCRIPTION OF DRAWINGS

This invention will now be described in further detail with reference to a preferred embodiment thereof, as shown in the accompanying drawings.

In the drawings.

BEST MODE FOR CARRYING OUT THE INVENTION

Figure 1:
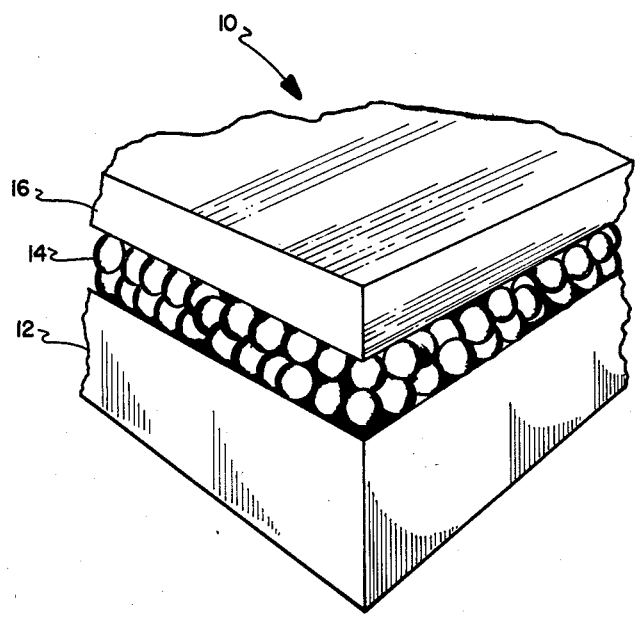
FIG. 1 is a perspective view of an insulated roof board according to this invention, with parts broken away.
Figure 2:
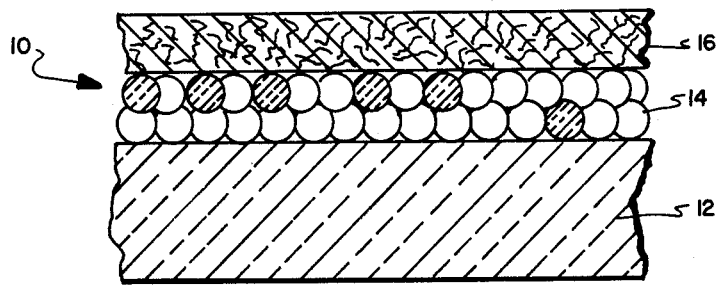
FIG. 2 is a vertical sectional view, with parts broken away, of the insulated roof board shown in FIG. 1.

Referring now to FIGS. 1 and 2, 10 is an insulated roof-board according to this invention. Insulated roof board 10 comprises a base layer 12 of rigid coherent insulating material, a coherent solid insulating intermediate layer 14 having void space therein to permit venting of water vapor, and a relatively hard, dense top layer 16.

Base layer 12 is preferably made of a foamed plastic insulating material, either polystyrene or polyurethane (the former is preferred), which is rigid, light in weight and yet strong. These materials are cellular in nature, either open or closed cell, typically comprising a large number of tiny air cells which do not communicate with the outside, as is well known. In addition, plastic materials of this type have good insulating properties and are very light in weight, yet strong. Alternatively, but less desirably, light weight other insulating materials may be used in place of a rigid foamed plastic material.

Base layer 12 is preferably in rectangular block form, with no air channels cut either through it or along any of its surfaces or edges.

Figure 3:
FIG. 3 is a front sectional view, on an enlarged scale, of a portion of the intermiediate layer shown in FIG. 2.

The intermediate layer 14 is preferably made up of a plurality of shaped bodies of an insulating material which are adhesively secured together. These bodies are of such shape as to provide void space within the intermediate layer 14. This void space is open to the atmosphere along the side edges of board 10 so that water vapor may escape. Intermediate layer 14 is preferably made up of a plurality of small shaped bodies, preferably of a light weight, insulating foamed plastic material such as polystyrene beads 18 (see especially FIGS. 2 and 3) which are adhesively secured together to form a coherent solid mass having the aforesaid voids which permit the escape of water vapor. Adhesion between beads may be provided by coating each bead with a very thin coating 19, best seen in FIG. 3, of a suitable adhesive material. This adhesive material may be a petroleum based or acrylic emulsion which on evaporation of the liquid dispersing agent becomes an adhesive. Particularly when polystyrene or other foamed plastic beads are used, the beads at the side edges of the board may be cut so that planar faces are exposed. These planar faces are cross-hatched in FIGS. 2 and 3.

Intermediate layer 14 is in the shape of a rectangular solid, having opposite top and bottom surfaces. The intermediate layer 14 is bonded directly to the base layer 12 along its bottom surface and to the top layer 16 along its top surface. In short, the preferred insulated roof board 10 contains no intermediate layers (not shown) other than layer 14 between the base and top layers 12 and 16, respectively.

The beads 18 forming intermediate layer 14 are typically all of the same shape, e.g., spherical, and may be either of substantially uniform size or varying sizes. In a preferred embodiment, bead diameters are in the range of about ⅛ inch (0.125") to about ½ inch (0.5").

Other shaped bodies may be used, provided that the shape is such as to provide the aforesaid void. For example, polystyrene "noodles" may be used. Shapes which will pack so as not to form void space readily, such as rectangular solids of uniform size, are not preferred.

The adhesive coating 19 is quite thin, ranging from molecular dimensions (e.g. 1 or 2 molecules thick) up to a maximum of not over about 0.6 mm (about 0.025" or 25 mils).

The top layer 16 is a relatively hard, dense protective layer. The terms "relatively hard, dense" indicate a layer which is both harder and denser than either the bottom layer 12 or the intermediate layer 14. Top layer 16 protects the rest of the roof board 10 from moisture and impact. Top layer 16 should be strong enough to permit persons (workmen, for example) to walk around on it and to support any desired roofing structure (such as roofing shingles and a supporting framework therefor). Top layer 16 should be a material which is capable of receiving a coating, e.g. of paint or bituminous emulsion, to improve the water-proofness of this layer and/or to permit the application of additional roofing layers not shown. Preferred materials for top layer 16 are cellulosic materials, and especially coherent particulate cellulosic materials such as bagasse, fiberboard, hardboard and particle board. Wood may be used but is generally not preferred because of its higher cost. Also, the desired structural strength, impact resistance, fire retardancy, ability to receive a coating and other desired characteristics can be obtained with a coherent particulate cellulosic material as aforedescribed. The preferred material is hardboard.

The thickness of an insulated roof board according to this invention may range from about 1.5 to about 4 inches. The heat insulation value increases with increasing thickness, as is readily apparent. A preferred insulated roof board 10 according to this invention has a thickness of about 3 inches or slightly greater (e.g., about 3.25 inches), and includes a base layer 12, of foamed polystyrene about 2 inches thick, an intermediate layer of foamed polystyrene beads about 0.8 inches thick and comprising polystyrene beads ranging in diameter from about ⅛ inch to about ½ inch, and thinly coated with a petroleum based adhesive which is applied in the form of an emulsion; and a top layer of cellulosic material which is about 0.5 inch thick. These dimensions are merely representative and may be varied.

The length and width of insulated roof board 10 may be as desired. For example, board 10 may be provided in the form of panels 4 feet by 8 feet. Alternatively, it may be provided in the form of larger or smaller panels. Other suitable sizes, by way of example, include 3×3 feet, 4×4 feet, and 10×10 feet. The roof board 10 of this invention is easily cut, either precut or cut on the job site, to desired roof dimensions.

Roof board 10 of this invention is particularly useful in flat roofs or decks. However, it may also be used in pitched roofs and even in walls. When used in walls, the base layer 12 is toward the interior of the building and the "top" layer 16 is toward the outside.

Insulated roof board of this invention may be placed on top of conventional roofing structures, as for example, on top of a concrete slab as shown for example in U.S. Pat. No. 3,619,961, or on top of a wooden deck as shown for example in U.S. Pat. No. 3,135,069. The roof board 10 may be secured to the supporting structure underneath it by conventional means, such as bituminous material which is hot when applied. The roofing deck underneath the roof board 10 may include a water tight member, such as a corrugated metal shown in U.S. Pat. No. 4,021,981.

Figure 4:
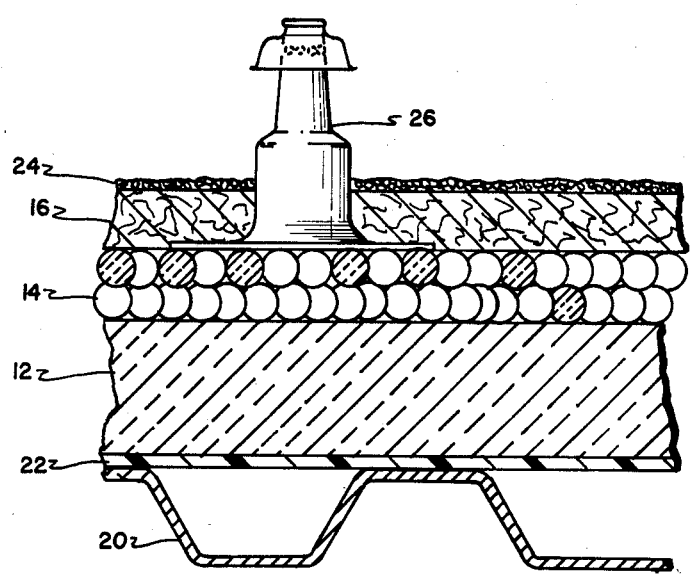
FIG. 4 is a vertical sectional view, with parts broken away, of a roof assembly including the insulated roof board shown in FIG. 1.
Figure 5:
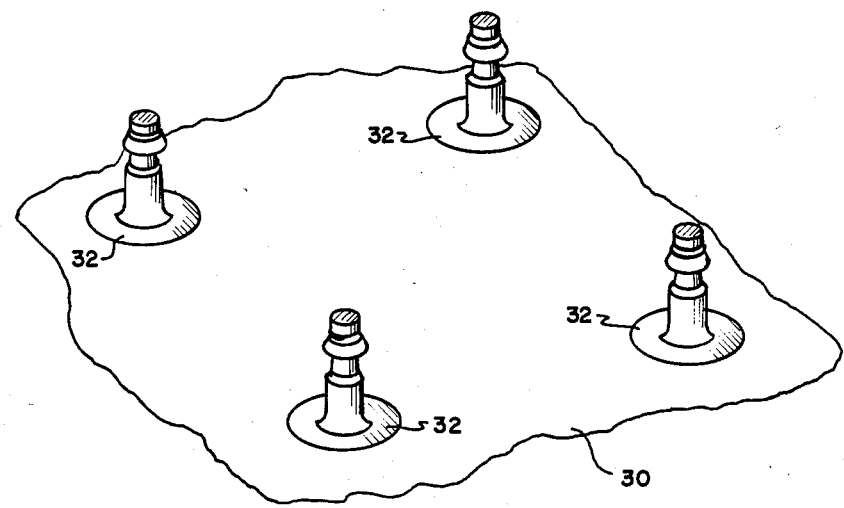
FIG. 5 is a perspective view as seen from above of a roof having vents therein.

A representative roofing assembly according to this invention is shown in FIG. 4. Referring to FIG. 4, such roofing assembly may include (going upwardly in the order named) a roof deck (e.g. a corrugated metal sheet) 20, a water and vapor impermeable membrane 22 (which is optional), and an insulated roof board 10 according to this invention. The water and vapor impermeable membrane 22 may be of a known type. This membrane 22 may be adhered to roof deck 20 and to roof board 10 and the protective top layer 16 by a suitable means, e.g. mechanical means such as a screw or clip, or by an adhesive such as an asphalt-, bituminous- or rubber-base adhesive. Suitable adhesives are known in the roofing art. A layer 24 of waterproofing material, such as asphalt or bitumen, which may be filled with crushed rock or stones, may be placed on top of top layer 16 of insulated roof board 10. This layer keeps out rain and snow but is not water vapor impermeable. Vents 26 may be provided for venting moisture from the interior space of the roof to the outside. As shown in FIG. 4, vents 26 may extend upwardly through the top layer 16 of insulated roof board 10. Vents 26 may extend through insulated roof board 10 or a portion thereof, but should not extend through corrugated sheet 20 or impermeable membrane 22. Vents 26 may be arranged in any suitable manner, such as a square arrangement shown in FIG. 5, or a triangular arrangement. FIG. 5 shows a plurality of spaced vents 26, extending through the exterior surface layer 30 of a roof.

The roofing structure above the insulated roof board 10 herein may be conventional. For example, one may apply, as the exterior surface layer, an aesthetically pleasing material (shingles, for example) supported by a suitable structure such as plywood, above insulated roof board 10. Such superstructure may be attached by mechanical means or by an adhesive coating 24, as for example bituminous material, to be applied to the top surface of the top layer 16. This coating may serve both as an adhesive and a waterproofing material. Alternatively, coating 24 may serve as the exterior surface layer.

A plurality of vertical vents 26, which may be conventional, may be placed at desired intervals (e.g., one every 700 square feet) to assist in venting water vapor from the building roof.

The various sub-structures below roof board 10, and super-structures above roof board 10 disclosed herein, are merely by way of example and not by way of limitation. These are cited to show how the present roof board may be integrated with conventional roofing materials and constructions.

The insulated roof board 10 of this invention efficiently vents water vapor to the atmosphere while keeping out water in the form of rain or snow. A problem with presently known roof insulation construction is that water may condense between the insulation and the water and vapor impermeable membrane, then varporize later due to the heat of the sun. As the water vaporizes, it expands greatly. The resulting water vapor pressure between the membrane and the insulation manifests itself by blistering the membrane surface and separating the plies in built-up membrane constructions. This water vapor and any undispersed moisture within the insulation will cause premature membrane failure and will ultimately cause deck failure by rotting or rusting. The present roof board 10 and roofing assembly avoids this. Any water which condenses between the roof board 10 and membrane 22 and later vaporizes, escapes laterally to the atmosphere through the voids in intermediate layer 14. Such escape may be assisted by vents 26 as aforedescribed.

The roof board of the present invention is very strong, yet light in weight. This board having the preferred materials and dimensions indicated, will support a load of 800 pounds per square foot. The weight of this preferred roof board is only about 1.5 pounds per square foot. A weight not exceeding about 5 pounds per square foot is desirable in any case. In addition, the roof board of this invention is fire retardant, keeps moisture out of the buidling, yet permits efficient venting of water vapor from the roofing structure. Above all, the roof board herein has outstanding insulation properties.

While in accordance with the patent statutes, a preferred embodiment and best mode has statutes, a preferred embodiment and best mode has been presented, the scope of the invention is not limited thereto, but rather is measured by the scope of the attached claims.

What is claimed is:

1. An insulated roof board comprising:
   (a) a base layer of rigid coherent insulating material,
   (b) a coherent solid insulating intermediate layer having void space therein to permit venting of water vapor; and
   (c) a relatively hard, dense top layer.

2. An insulated roof board according to claim 1 in which said base layer is a rigid foamed plastic insulating material.

3. An insulated roof board according to claim 2 in which said base layer is foamed polyurethane.

4. An insulated roof board according to claim 2 in which said base layer is foamed polystyrene.

5. An insulated roof board according to claim 1 in which said intermediate layer comprises a plurality of shaped bodies of insulating material adhesively secured together, the bodies being of such shape and orientation as to provide said void space.

6. An insulated roof board according to claim 4 in which said shaped bodies are beads.

7. An insulated roof board according to claim 5 in which said beads are essentially spherical and of different diameters.

8. An insulated roof board according to claim 5 in which said beads are polystyrene.

9. An insulated roof board according to claim 1 in which said relatively hard, dense layer is made of a cellulosic material.

10. An insulated roof board according to claim 9 in which said cellulosic material is a coherent particulate material.

11. An insulated roof board according to claim 1 in which said intermediate layer is in abutting relationship with said base layer and said top layer.

12. A roofing assembly comprising:
   (a) a roof deck;
   (b) a water and vapor impermeable membrane; and
   (c) an insulated roof board comprising
      (1) a base layer of rigid, coherent insulating material;
      (2) a coherent solid insulating intermediate layer having void space therein to permit venting of water vapor; and
      (3) a relatively hard, dense top layer.

13. A roofing assembly according to claim 12 in which said base layer is a foamed plastic and said intermediate layer comprises a plurality of shaped beads of insulating material.

14. A roofing assembly according to claim 12, further including an exterior surface layer above said insulated roof board and a plurality of spaced vents for removing water vapor from the space between said membrane and said exterior surface layer.

* * * * *